United States Patent
Kim

(10) Patent No.: US 6,974,141 B2
(45) Date of Patent: Dec. 13, 2005

(54) STEERING KNUCKLE ASSEMBLY FOR STEERING APPARATUS IN MOTOR VEHICLE

(75) Inventor: Geun-Bae Kim, Kyunggi-do (KR)

(73) Assignee: Hyundai Mobis Co., Ltd., Yongin-shi (KR)

( * ) Notice: Subject to any disclaimer, the term of this patent is extended or adjusted under 35 U.S.C. 154(b) by 154 days.

(21) Appl. No.: 10/725,365

(22) Filed: Dec. 3, 2003

(65) Prior Publication Data

US 2005/0067805 A1    Mar. 31, 2005

(30) Foreign Application Priority Data

Sep. 29, 2003  (KR) ...................... 10-2003-0067240

(51) Int. Cl.[7] .................................... B62D 7/18
(52) U.S. Cl. .......................... 280/93.512; 280/93.502; 280/93.507
(58) Field of Search ...................... 280/93.51, 93.511, 280/93.512, 93.502, 93.507

(56) References Cited

U.S. PATENT DOCUMENTS

| | | | | |
|---|---|---|---|---|
| 4,878,683 A | * | 11/1989 | Dever | 180/253 |
| 5,120,150 A | | 6/1992 | Kozyra et al. | |
| 5,219,176 A | * | 6/1993 | Mitchell | 280/93.512 |
| 5,348,334 A | * | 9/1994 | Giltinan | 280/124.138 |
| 6,398,240 B1 | * | 6/2002 | Taylor | 280/93.512 |
| 6,616,156 B1 | * | 9/2003 | Dudding et al. | 280/93.512 |
| 6,729,633 B1 | * | 5/2004 | Irwin | 280/86.75 |

FOREIGN PATENT DOCUMENTS

| | | |
|---|---|---|
| JP | 5-193513 | 8/1993 |
| JP | 6-201305 | 7/1994 |

* cited by examiner

Primary Examiner—Paul N. Dickson
Assistant Examiner—Toan C. To
(74) Attorney, Agent, or Firm—Greenblum & Bernstein, P.L.C.

(57) ABSTRACT

A steering knuckle assembly for a steering apparatus in a motor vehicle has an attachable and separable connector for ball joint connection between a tie rod and a knuckle. Therefore, the tie rod can be more easily separated from the knuckle at improved work efficiency, and the entire knuckle assembly does not have to be newly developed to change a ball joint point of the end of the tie rod. As a result, manufacture cost is greatly reduced and work efficiency for the steering knuckle assembly is improved.

2 Claims, 3 Drawing Sheets

[FIG. 1]
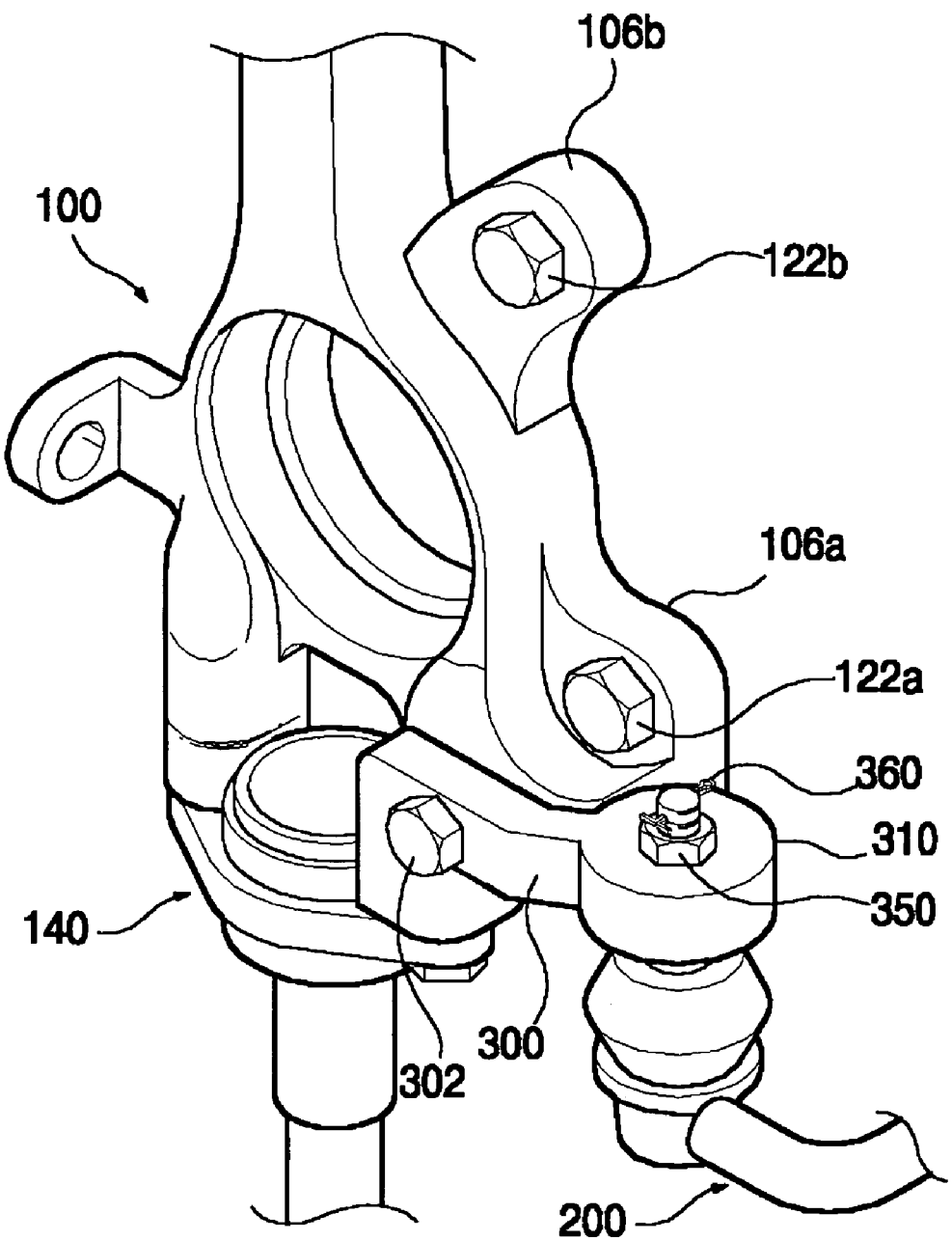

[FIG. 2]
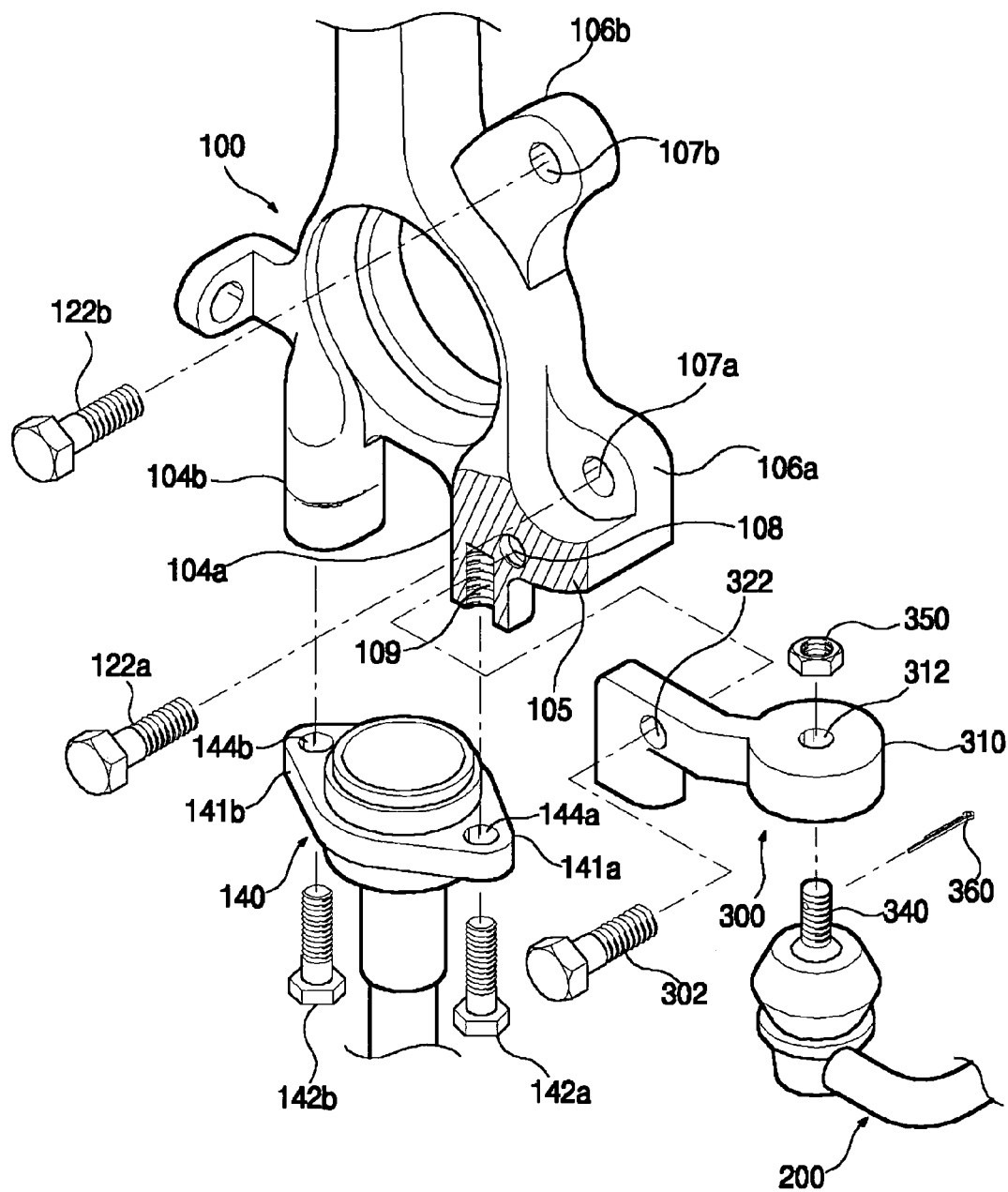

[FIG. 3]
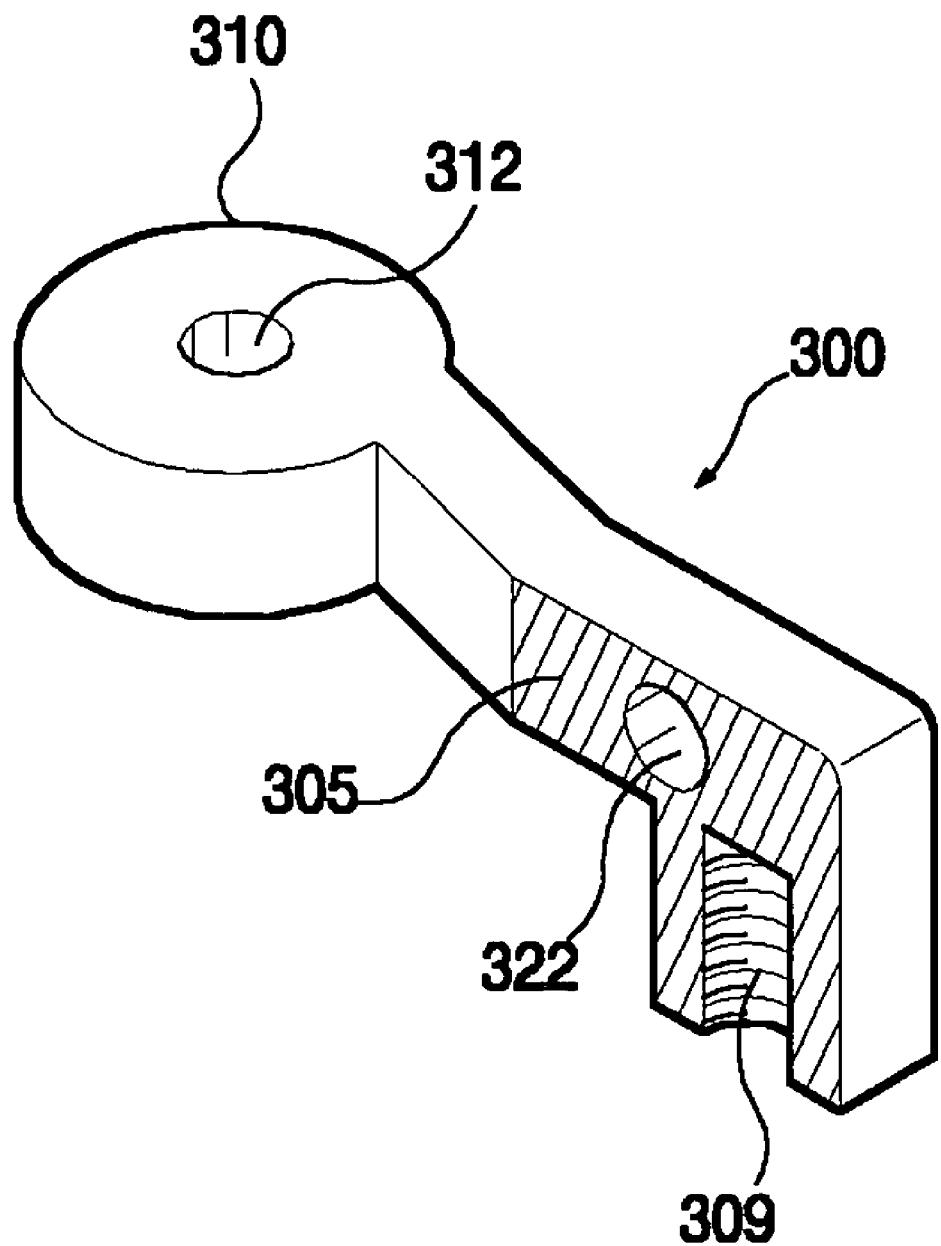

STEERING KNUCKLE ASSEMBLY FOR STEERING APPARATUS IN MOTOR VEHICLE

RELATED APPLICATIONS

The present disclosure relates to subject matter contained in priority Korean Application No. 10-2003-0067240, filed on Sep. 29, 2003, which is herein expressly incorporated by reference in its entirety.

BACKGROUND OF THE INVENTION

1. Field of the Invention

The present invention relates to a steering knuckle assembly for a steering apparatus in a motor vehicle, which is capable of improving work efficiency associated with the separation of a tie rod from the knuckle as well as work convenience in changing a ball joint point at an end of the tie rod having great influence on toe changes or toe conditions of the vehicle, whereby a proper toe angle can be achieved without developing a new knuckle assembly.

2. Description of the Related Art

In general, the steering apparatus of a vehicle allows a driver to steer the vehicle to any direction he or she wants to go, and includes an operation structure, a gear unit, and a link structure.

The operation structure is composed of a steering wheel, a steering shaft, and a column. When the driver operates the steering wheel, the gear unit and the link structure get influenced of the operation of the steering wheel.

The gear unit is a part that changes the driving direction of the operation structure and transfers its momentum to the link structure. Typically, a rack and a pinion are used in a small-sized car. As the pinion rotates, the rack engaged with the pinion moves horizontally from side to side.

Lastly, the link structure is a part that transfers the operation or motion of the gear to front wheels and at the same time, ensures correct wheel alignment on both sides. Usually, the link structure includes a tie rod connected to both ends of the rack, and a steering knuckle coupled with a ball joint at the end of the tie rod.

As such, when the driver operates the steering wheel, the tie rod connected to the rack moves from side to side, under operations of the pinion and the rack, and as a result thereof, the wheel is steered to a desired direction.

Among the steering apparatus aforementioned, particularly a steering knuckle assembly has been disclosed in U.S. Pat. No. 5,120,150 and Japanese Patent Publication Nos. 5-193513 and 6-201305. According to their teachings, a hub is inserted into a central portion of the knuckle, and using a ball bearing as a medium, an (vehicle) axle is fit in. Also, a brake disc is mounted on the hub.

Further, a ball joint bracket is mounted on the lower portion of the knuckle to have a ball joint disposed at the end of a lower arm of a suspension coupled thereto, and the end of the tie rod is connected to the ball joint. On the upper portion of the knuckle, on the other hand, is a caliper for generating a brake force by pressing the rotatory brake disc.

Here, a ball stud affixed to the end of the tie rod is inserted into the knuckle and fastened thereto by a nut. In this manner, the tie rod and the knuckle make a ball joint connection together. To prevent the nut from loosening from the ball stud, a split pin is inserted into the ball stud.

In the related art knuckle assembly, however, when the tie rod needs to be separated from the knuckle, the space between the ball joint connecting portion of the tie rod and the caliper mounting portion was so small that it was not easy to remove the split pin affixed to the ball joint connecting portion without deteriorating work efficiency.

Moreover, if a tie rod end point (the center of the ball joint connecting the tie rod with the knuckle) known to have critical influence on toe conditions of the vehicle is changed, the entire knuckle assembly had to be newly developed, and in so doing, manufacture cost was increased and work efficiency was lowered.

SUMMARY OF THE INVENTION

It is, therefore, an object of the present invention to provide a steering knuckle assembly for a steering apparatus in a motor vehicle, capable of improving work efficiency associated with the separation of a tie rod from the knuckle and work convenience in changing a ball joint point at a tie rod end, by mounting on the knuckle an attachable and separable connector for connecting the tie rod with the knuckle via ball joint.

To achieve the above object, there is provided a steering knuckle assembly for a steering apparatus in a motor vehicle, including: a main body; and a connector coupled to the main body through a connection to an end of a tie rod, wherein a first coupling surface for coupling with the connector is formed on the main body and a second coupling surface to be joined with the first coupling surface is formed on the connector, and a screw groove with a processed screw thread is formed on the first and second coupling surfaces, respectively, to have a bolt fastened thereto.

The above constitution makes the removal of the split pin much easier without getting interfered by the caliper mounting portion as in the related art, because the removal of the split pin in the ball joint portion of the invention is performed after the connector is separated from the main body first.

Moreover, the coupling force between the main body and the connector is strengthened by joining the first flat coupling surface with the second flat coupling surface formed on the main body and on the connector.

Further, in case that a tie rod end point connecting the knuckle with the tie needs to be changed, the entire knuckle assembly does not have to be changed any longer as is in the related art. Instead, only the connector with appropriate designs and sizes can be separately installed. Therefore, the steering knuckle assembly of the invention can reduce manufacture cost and improve work efficiency.

BRIEF DESCRIPTION OF THE DRAWINGS

The above objects, features and advantages of the present invention will become more apparent from the following detailed description when taken in conjunction with the accompanying drawings, in which:

FIG. 1 is a perspective view of one embodiment of a knuckle assembly for a motor vehicle of the present invention;

FIG. 2 is a perspective view of disassembled knuckle assembly of FIG. 1; and

FIG. 3 is a perspective view of the other side of a connector depicted in FIG. 2.

DETAILED DESCRIPTION OF THE PREFERRED EMBODIMENT

A preferred embodiment of the present invention will be described herein below with reference to the accompanying drawings. In the following description, well-known functions or constructions are not described in detail since they would obscure the invention in unnecessary detail.

FIG. 1 is a perspective view of one embodiment of a knuckle assembly for a motor vehicle of the present invention, FIG. 2 is a detailed perspective view of disassembled knuckle assembly of FIG. 1, and FIG. 3 is a detailed perspective view of the other side of a connector depicted in FIG. 2.

Referring to FIGS. 1 to 3, the knuckle assembly of the present invention includes a knuckle main body 100, and a connector 300 for making a ball joint connection with a tie rod 200, the connector 300 being attachable and separable to and from the main body 100.

At the lower end portion of the main body 100 is a pair of ball joint mounting portion 104a and 104b, being protruded downward in such a manner that a ball joint 140 to be connected with a lower arm of a suspension (not shown) can be mounted thereon.

A first coupling surface 105 whose front surface side is partially flat is formed on one side of the ball joint mounting portion 104a to be coupled with the connector 300, and a second coupling surface 305, which is also flat, is formed on the connector 300 to be coupled with the first coupling surface 105.

Also, a through hole 322 is formed on the connector 300, into which a bolt 302 is inserted. To fasten or screw the bolt 302 inserted into the through hole 322 by a screw, a screw hole 108 is formed on the main body 100, whereby the connector 300 and the main body 100 can be screwed together.

Likewise, a pair of through holes 144a and 144b to which bolts 142a and 142b are inserted is formed on each of fixing portions 141a and 141b on both sides of the ball joint 140 that is attached to the lower end portion of the main body 100. To fasten or screw the bolts 142a and 142b inserted into the through holes 144a and 144b, screw holes (not shown) are formed on the ball joint mounting portions 104a and 104b where the ball joint 140 is mounted.

Particularly, the screw hole disposed at the ball joint mounting portion 104a where the connector 300 is attached is divided into two: a first screw groove 109 formed on the first coupling surface 105, and a second screw groove 309 formed on the second coupling surface 305. Therefore, when the connector 300 is installed at the main body 100, the first screw groove 109 and the second screw groove 309 are joined with each other so that the bolt 142a can be fastened thereto.

With the above assembly structure, the connector 300 can be treated as a separate, independent structure, and thus, any one can easily attach and separate the connector to and from the main body 100 through the bolt 302.

On the other hand, a pair of caliper mounting portions 106 and 106b is formed on one upper side of the main body 100, and inside of these caliper mounting portions 106a and 106b are through holes 107a and 107b for the insertion of bolts 122a and 122b.

Besides the through holes 107a and 107b formed inside of the caliper mounting portions, there are other through holes (not shown) formed at opposition positions of those through holes 107a and 107b. Therefore, when the caliper is assembled to the main body 100, the bolts 122a and 122b inserted into the through holes 107a and 107b on the knuckle main body 100 as well as the opposite through holes (not shown) thereof, and nuts (not shown) are fastened to the bolts 122a and 122b from the opposite side.

Also, a connection end 310 connected to the tie rod 200 is formed on one end of the connector 300 which is coupled with the main body 100. As shown in the drawings, an insertion hole 312 is bored in the connection end 310 so that the ball stud 340 connected to the end of the tie rod 200 can be inserted thereto.

Hence, when the tie rod 200 is inserted into the insertion hole 312 of the connector 300 and fastened by the nut 350, the ball stud 340 is already affixed to the end of the tie road 200. In this manner, the tie rod 200 makes a ball joint connection with the connector 300, thereby moving together. At this time, a split pin 360 is inserted into the ball stud 340 in order to ensure that the nut 350 is firmly fastened and not loosened.

As for the assembly of the present invention with the above constitution, the connector 300 is first put closely to the main body in such a manner that the first coupling surface 105 and the second coupling surface 305 are joined to each other, and then the bolt 302 is inserted into the through hole 322 of the connector 300 and fastened or screwed to the screw hole 108 of the main body 100.

As such, the first screw groove 109 formed on the first coupling surface 105 of the ball joint mounting portion 104a of the main body 100 and the second screw groove 309 formed on the second coupling surface 305 of the connector 300 are joined together, and as a result, the ball joint mounting portion 104a of the main body 100 can secure a space for a screw hole to which the bolt 142a of the ball joint 140 is fastened.

Next, the ball joint 140 coupled to a lower arm (not shown) is assembled to the ball joint mounting portions 104a and 104b through bolts 142a and 142b, and at the same time, the ball stud 340 affixed to the end of the tie rod 200 is inserted into the insertion hole 312 formed on the connection end 310 of the connector 300, and lastly, the nut 350 and the split pin 360 are fastened together to finish up the assembly.

Meanwhile, if one wants to separate thusly assembled connector 300 from the main body 100, he or she first needs to loosen the bolt 302 fastened to the connector 300, and to unfasten the bolts 142a and 142b of the ball joint 140 to separate or disassemble the ball joint 140 from the ball joint mounting portions 104a and 104b. Afterwards, the tie rod 200 can be separated from the connector 300 by removing the split pin 360 of the connector 300 and by unfastening the nut 350 from the ball stud 340.

Since the split pint 360 attached to the ball joint portion is removed after the connector 300 is separated from the main body 100 first, the removal of the split pin 360 can be easily achieved without interfering with the caliper mounting portion as in the related art.

Moreover, the entire knuckle assembly does not have to be changed just because the ball joint position with the knuckle main body 100 and the tie rod 200 needs to be changed. Instead, the connector 100 is the only thing to be changed, and can be manufactured in various shapes and sizes as needed.

In conclusion, the present invention can be advantageously used for the removal of the split pin without being interfered by the caliper mounting portion, as in the related art, because the removal of the split pin in the ball joint portion of the invention is conducted after the connector is separated from the main body first.

Moreover, the coupling force between the main body and the connector can be strengthened by joining the first flat coupling surface with the second flat coupling surface formed on the main body and on the connector.

Further, in case that the tie rod end point (the center of the ball joint connecting the tie rod with the knuckle) having critical influence on toe conditions of the vehicle needs to be changed, the entire knuckle assembly does not have to be changed any longer as is in the related art. Instead, only the connector with appropriate designs and sizes can be separately installed. Therefore, the steering knuckle assembly of the invention can reduce manufacture cost and improve work efficiency.

While the invention has been described in conjunction with various embodiments, they are illustrative only. Accordingly, many alternative, modifications and variations will be apparent to persons skilled in the art in light of the foregoing detailed description. The foregoing description is intended to embrace all such alternatives and variations falling with the spirit and broad scope of the appended claims.

What is claimed is:

1. A steering knuckle assembly for a steering apparatus in a motor vehicle, comprising:
   a main body; and
   a connector coupled to the main body through a connection to an end of a tie rod, wherein a first coupling surface for coupling with the connector is formed on the main body and a second coupling surface to be joined with the first coupling surface is formed on the connector, and a screw groove with a processed screw thread is formed on the first and second coupling surfaces, respectively, to have a bolt fastened thereto.

2. The steering knuckle assembly according to claim 1, wherein a ball joint for connection with a lower arm is further installed in the main body, the ball joint being coupled by the bolt.

* * * * *